Patented Feb. 27, 1940

2,191,530

UNITED STATES PATENT OFFICE 2,191,530

COATING COMPOSITION

Robert Tyler Hucks, South River, N. J., assignor to E. I. du Pont de Nemours & Company, Wilmington, Del., a corporation of Delaware No Drawing. Application April 5, 1938, Serial No. 200,123

7 Claims. (Cl. 260—16)

This invention relates to improved coating compositions and more particularly to non-bronzing maroon pigmented cellulose derivative enamel compositions.

When finishing the exterior of automobile bodies, after application of the necessary primer, surfacer and ground coat, it is the practice to spray on several coats of pigmented nitrocellulose enamel of the desired color. Finishes so applied usually are slightly rough and exhibit what is known in the trade as "orange peel." To produce a smooth lustrous finish, it is necessary to rub and polish the surface in such a manner that the "orange peel" appearance is removed. The present practice is to go over the surface with high speed carpet buffs. An abrasive, usually in paste form, is employed in this buffing operation. The surface is then cleaned and brought to a high luster with high speed lamb's wool buffs.

In the operation described above the enamel surface is severely abraded and through the friction is momentarily subjected to relatively high temperatures. In the case of previously available maroon enamels, this abrasion and the incidental heat cause the formation of a metallic appearance on the surface of the finish commonly known as "bronzing." This bronzing effect is on the surface of the finish and may be partially removed by rubbing with the finger. It usually appears within 24 hours after the buffing operation, but has been known to appear even after several days. Frequently it appears as blotches, but occasionally it is found to cover the entire surface. It is needless to say that this condition is a very serious one and results in high costs for repolishing in order to produce a satisfactory finish.

There are a number of types of conditions which are variously described as bronzing in pigmented cellulose derivative enamel compositions. Some pigmented finishes show a bronzy appearance when viewed at certain angles. There are also certain finishes which when exposed to rain and sunlight over a period of time develop a bronzy appearance. The bronzing condition referred to throughout this specification is that caused by abrasion and/or heat. It may be induced experimentally by briskly rubbing the film surface with a coarse texture cloth and then heating at a temperature of approximately 65° C. for one hour.

Due to the fact that the maroon pigments are not generally durable in cellulose derivative enamel compositions, the number of usable pigments in such finishes designed for outdoor exposure is very limited. Metallic salt maroon pigments of the Lake Bordeaux B type have been used extensively in nitrocellulose lacquers. Finishes made with this type of maroon pigment do not show the objectionable bronzing defect due to abrasion, but lack beauty and depth of color and lose their luster when subjected to atmospheric conditions thus precluding their general use.

A maroon pigment prepared by coupling meta-nitranilide of 2-hydroxy-3-naphthoic acid with diazotized 3-nitro-4 amino toluene (meta nitro-para-toluidine), which has been used still more extensively in the past in nitrocellulose lacquer compositions, gives satisfactory durability when exposed to the outdoor atmosphere but bronzes badly under high speed buffing.

This invention has as an object the provision of an improved maroon-pigmented cellulose derivative coating composition which is characterized by the elimination of bronzing tendencies heretofore generally encountered following the conventional buffing and polishing practices, particularly as applied in the finishing of the exterior of automobile bodies.

Another object is the provision of non-bronzing maroon cellulose derivative coating compositions which possess excellent durability when exposed to atmospheric conditions.

These objects are accomplished by incorporating by any suitable means in a cellulose derivative vehicle a maroon pigment prepared by coupling meta-nitranilide of 2-hydroxy-3-naphthoic acid with diazotized 3-nitro-4 amino-anisol (meta-nitro-para-anisidine) or diazotized 5-nitro-2 amino-anisol (meta-nitro-ortho-anisidine).

These azo pigments may be prepared in accordance with the process disclosed in copending application of Alfred Siegel, Serial No. 200,074, filed April 5, 1938.

The following example illustrates the preferred embodiment of this invention:

Example 1

|  | Per cent |
|---|---|
| Maroon pigment* | 5.00 |
| Cellulose nitrate—½ sec. visc. | 10.50 |
| Synthetic resin solution | 7.60 |
| Dibutyl phthalate | 3.50 |
| Blown castor oil | 2.20 |
| Ethyl alcohol—denatured | 10.00 |
| Methyl ethyl ketone | 13.00 |
| Ethyl acetate | 13.50 |
| Toluol | 13.70 |
| Isobutyl acetate | 15.00 |
| Amyl alcohol | 6.00 |
|  | 100.00 |

*Prepared by coupling diazotized meta-nitro-para-anisidine with the meta-nitranilide of 2-hydroxy-3-naphthoic acid. The structural formula for this pigment is as follows:

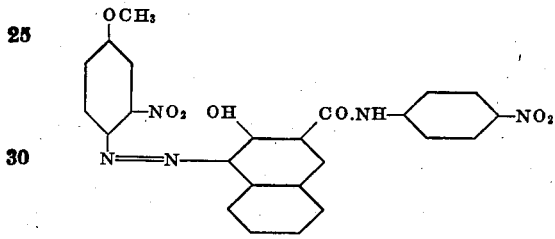

The resin solution of the above example consists of a mixture of 30 parts of toluol and 70 parts of a synthetic resin which is a reaction product of:

|  | Per cent |
|---|---|
| Glycerine | 15.4 |
| Phthalic anhydride | 37.4 |
| Cottonseed oil | 47.2 |
|  | 100.0 |

This resin may be prepared in accordance with known practice by first heating the glycerine and cottonseed oil for about three hours at 482° F. The phthalic anhydride is then added and heating continued at 482° F. for about ten hours or until an acid number of less than 10 is obtained.

In place of the maroon pigment specifically described in the example, satisfactory results may be obtained by the direct substitution of an isomer obtainable by coupling diazotized meta-nitro-ortho-anisidine with the meta-nitranilide of 2-hydroxy-3 naphthoic acid. On the other hand, a second isomer of this pigment prepared by coupling diazotized para-nitro-ortho-anisidine completely fails to provide the improved bronze resistant property which is obtained when the pigment shown in the example or the first aforementioned isomer is employed.

Preferably the resin ingredient of the above composition consists of an alkyd resin modified with a non-hydroxy, non-drying oil such as coconut or cottonseed oil, or blown oils of these types and preferably also with oil lengths of about at least 35%, although other types of modified alkyd resins are not excluded from the scope of the present invention. Other synthetic resins such as ester gum, phenol-formaldehyde, urea-aldehyde, vinyl and acrylic acid resins may also be employed as well as natural resins, for example, damar. The invention, however, is of particular utility when the coating vehicle includes the particular type of alkyd resin shown in Example 1 or other resin which similarly provides a slightly softer film than is secured with the more conventional type vehicles.

When the specific type of resin illustrated in Example 1 is employed the most satisfactory finish is obtained when the ratio of cellulose nitrate to resin is on the order of between about 5 to 10 parts of resin to 10 parts of cellulose nitrate.

The above coating composition is prepared by any of the commonly employed methods such as first dispersing the pigment in a suitable portion of the synthetic resin solution, adjusted by the addition of solvents and diluents, in such proportions as to permit working the mass in a ball mill or other known suitable devices. This pigmented intermediate is then placed in an ordinary paddle mixer together with the remaining ingredients in the proportions indicated. The mixture is thoroughly agitated until a homogeneous product is obtained.

In tinting the new maroon enamels for commercial use to develop a color or shade other than that afforded by the enamel containing the new maroon pigment as the sole pigment, it is preferable to use other red and maroon enamels only which are substantially non-bleeding and non-bronzing in character, for example, an enamel containing a maroon pigment of the Lake Bordeaux B type although, in any event, the new pigment should be present in relation to the other red or maroon pigments in preponderant amount in the final enamel for best durability results. In certain instances, it is permissible to include for tinting purposes an enamel based on bronzing type pigments such as para or toluidine toners, but the amount of these pigments which may be included in the final enamel should be kept at a minimum in order to maintain the improved non-bronzing properties which characterize the basic new single pigment enamel. In some cases it is also possible to incorporate the modifying color directly into the basic new maroon composition by simultaneous dispersion of the new pigment and the modifying pigment or pigments in a single vehicle by methods well known in the art.

The vehicle shown in the above example is preferred from the standpoint of flexibility and durability on exposure. Compositions based on other cellulose derivatives such as cellulose acetate and cellulose ethers, for example, ethyl cellulose may also be employed with the new pigments to advantage, particularly if the ultimate finish has physical properties similar to that provided by the composition of Example 1. In general vehicles which give harder, more brittle finishes are less susceptible to bronzing on abrasion but the resulting enamels are too brittle for practical use and show poor chalk and chip resistance under actual industrial and automotive usage.

The types and proportions of solvents, diluents, and plasticizers shown in the above example may be varied over a considerable range and the substitution of an equivalent material or a change in proportions to suit conditions of application or other special requirements is considered within the ordinary practice of one skilled in the art.

The coating compositions described herein have general use and are of particular merit where the finish requires rubbing and polishing to bring out the desired luster and smoothness in the surface of the finish.

Bronzing defects, which have generally characterized previously available maroon enamels when a finish produced therefrom is subjected to conventional rubbing and polishing operations are eliminated in the new compositions. As a result an obvious advantage of the invention is the maintenance of lower costs in automobile finishing due to the elimination of repolishing costs. The compositions further provide a deeper and richer color in the final finish and outdoor durability is also quite satisfactory.

It is apparent that many widely different embodiments of this invention may be made without departing from the spirit and scope thereof; and, therefore, it is not intended to be limited except as indicated in the appended claims.

I claim:

1. A non-bronzing maroon cellulose derivative coating composition comprising a cellulose derivative and an azo pigment selected from the class consisting of diazotized meta-nitro-para-anisidine coupled with meta-nitranilide of 2-hydroxy-3 naphthoic acid and diazotized meta-nitro-ortho-anisidine coupled with meta-nitranilide of 2-hydroxy-3 naphthoic acid.

2. Composition of claim 1 in which the cellulose derivative is cellulose nitrate.

3. A non-bronzing maroon cellulose nitrate coating composition comprising cellulose nitrate, an alkyd resin and an azo pigment selected from the class consisting of diazotized meta-nitro-para-anisidine coupled with meta-nitranilide of 2-hydroxy-3 naphthoic acid and diazotized meta-nitro-ortho-anisidine coupled with meta-nitranilide of 2-hydroxy-3 naphthoic acid.

4. Composition of claim 3 in which the alkyd resin is a non-drying oil modified alkyd resin.

5. Composition of claim 3 in which the alkyd resin is a cottonseed oil modified glyceryl phthalate resin.

6. Composition of claim 3 in which the alkyd resin is a coconut oil modified glyceryl phthalate resin.

7. Composition of claim 3 in which the ratio of cellulose nitrate to alkyd resin is between about 5 to 10 parts of resin to 10 parts of cellulose nitrate.

ROBERT TYLER HUCKS.